June 11, 1929.　　　　P. W. WILCOX　　　　1,717,080
APPARATUS FOR APPLYING GREASE TO BAKING PANS
Filed May 11, 1927　　　5 Sheets-Sheet 1
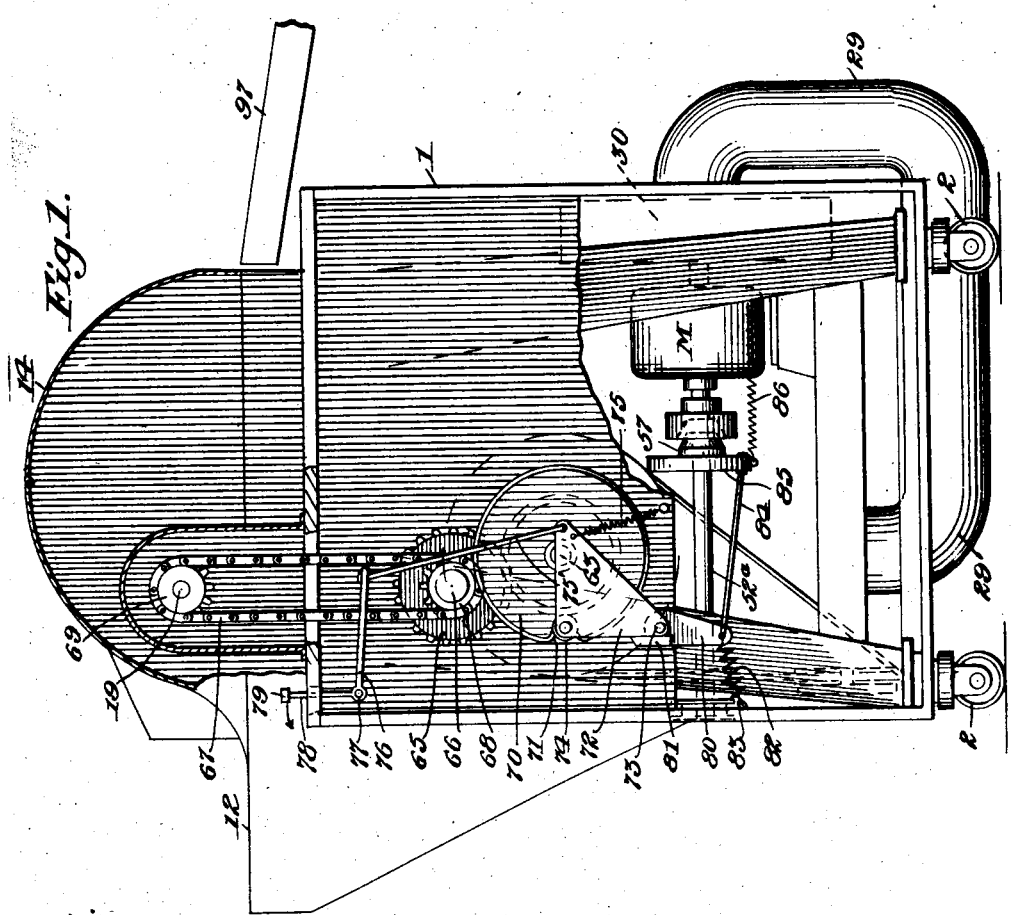
Inventor:
P. W. Wilcox,
By Sturtevant & Mason
Att'ys.

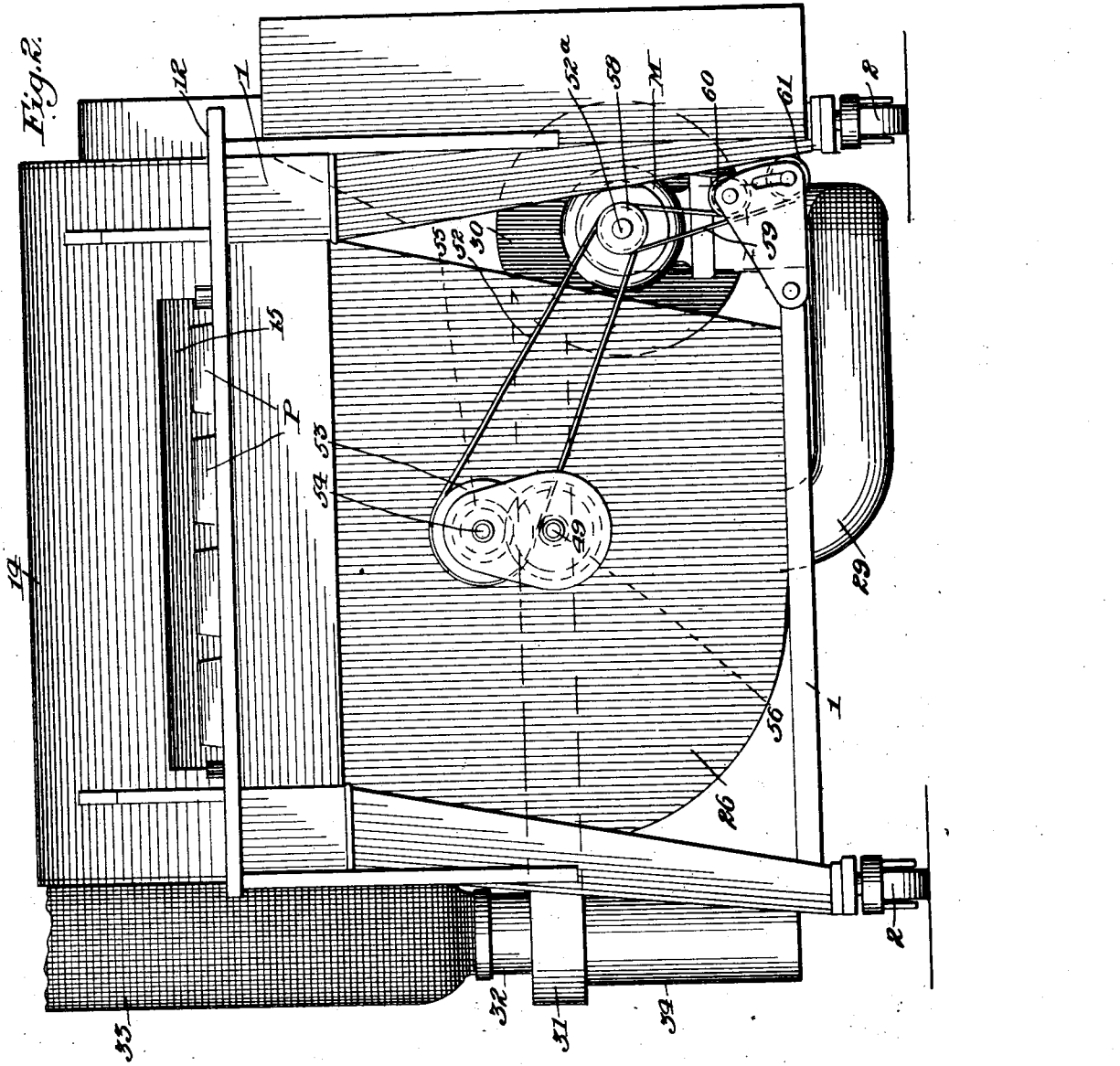

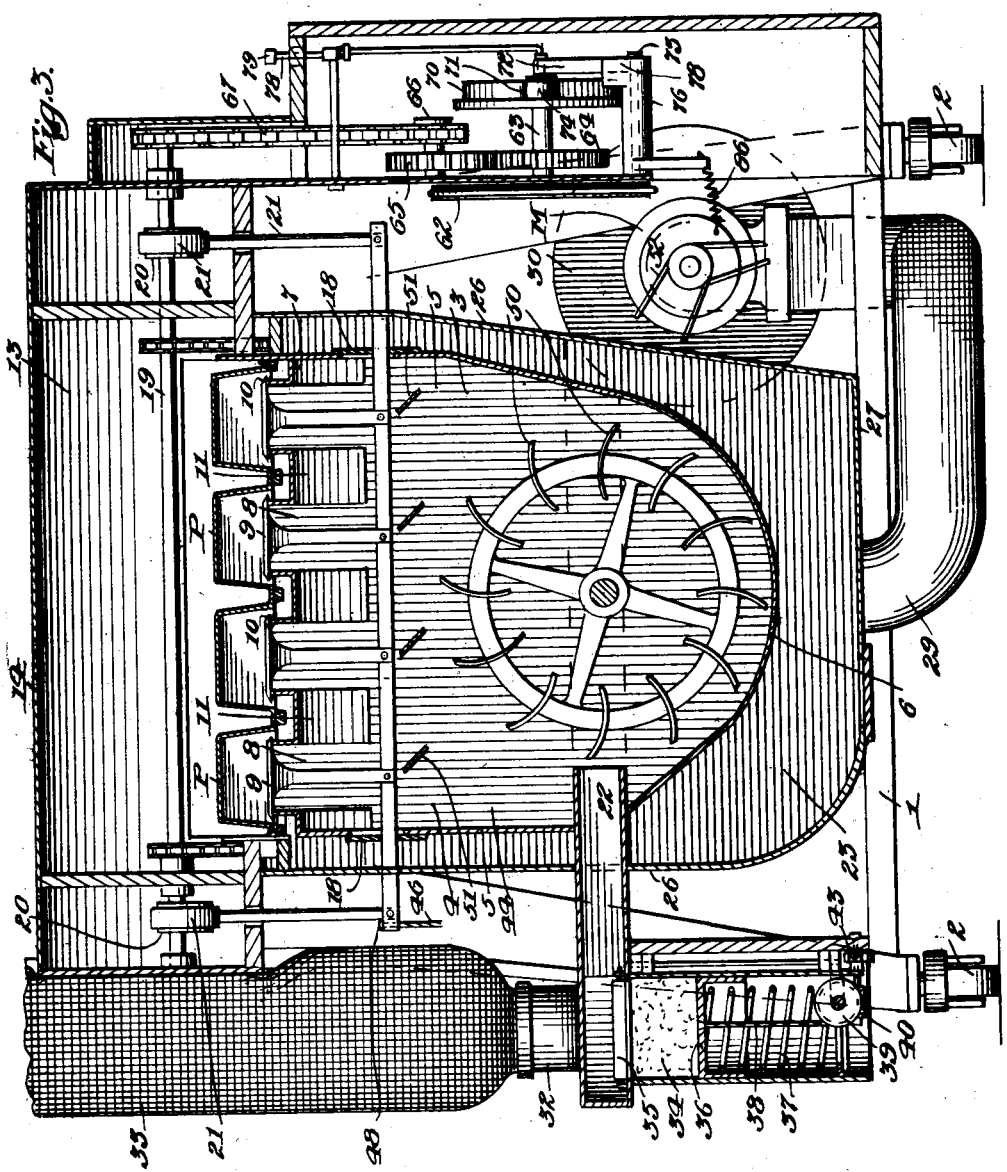

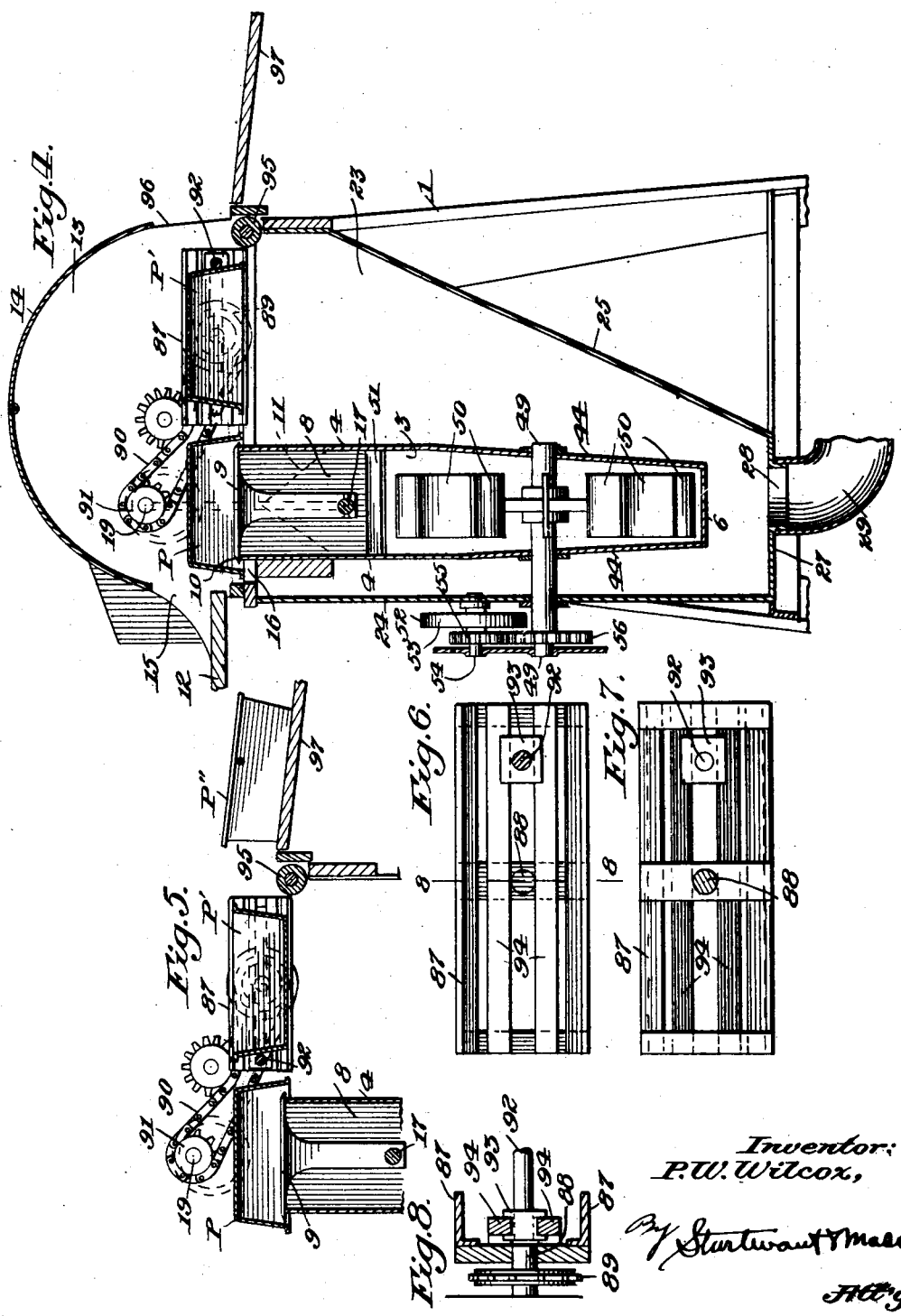

June 11, 1929.   P. W. WILCOX   1,717,080
APPARATUS FOR APPLYING GREASE TO BAKING PANS
Filed May 11, 1927   5 Sheets-Sheet 5
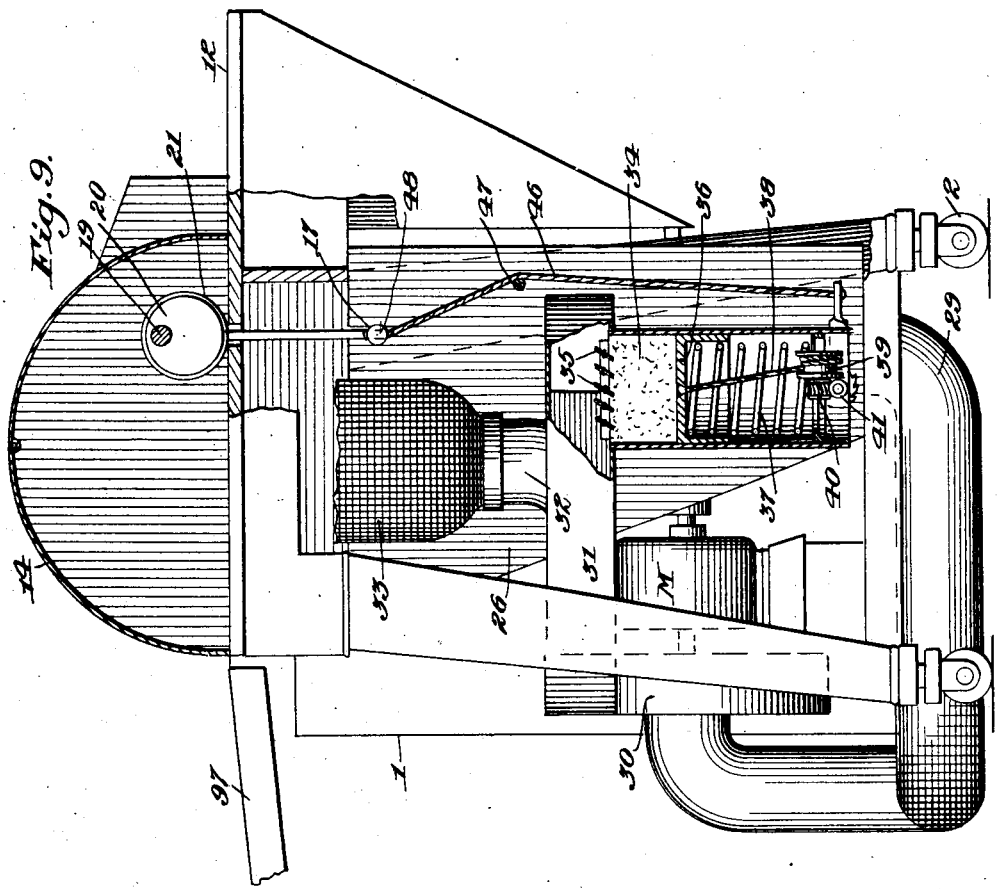
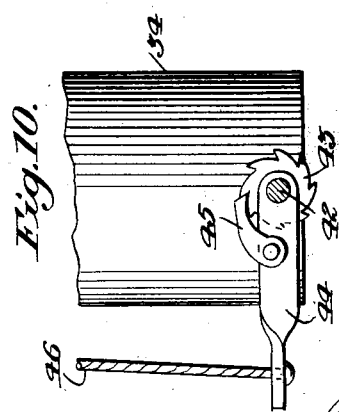
Inventor:
P. W. Wilcox,
By Sturtevant & Mason
Att'ys.

Patented June 11, 1929.

1,717,080

UNITED STATES PATENT OFFICE.

PHILIP W. WILCOX, OF ATLANTA, GEORGIA; KATHARINE RAWLING WILCOX EXECUTRIX OF PHILIP W. WILCOX, DECEASED.

APPARATUS FOR APPLYING GREASE TO BAKING PANS.

Application filed May 11, 1927. Serial No. 190,578.

The invention relates to new and useful improvements in an apparatus for applying grease to baking pans, and more particularly to an apparatus for dusting a powdered oil or grease on the surface of the baking pan.

An object of the invention is to provide an apparatus of the above type, through which the pans may be passed, which apparatus is so constructed that the powdered grease may be applied to the surface of the baking pan through the aid of circulating air charged with the finely powdered oil, and which apparatus is also so constructed that the air charged with the oil is prevented from escaping from the apparatus through the entrance and exit openings for the pans.

A further object of the invention is to provide an apparatus of the above type with a valve controlled means for directing the air current charged with the oil against the inner surface only of the baking pan.

A further object of the invention is to provide a device of the above character wherein the air supply means is so arranged and constructed that the current of air charged with the powdered oil is directed directly against the inner wall of the baking pan adjacent the open end thereof, and substantially at right angles to the wall, to aid in the causing of the powdered oil to adhere to the surface of the pan.

A still further object of the invention is to provide a device of the above type wherein the air supply means for directing the air current with the powdererd oil against the surface of the baking pan is controlled by a valve which is opened and closed progressively and disposed so that the coating of powdered oil on the surface of the baking pan is of maximum depth at the mouth of the pan and decreases toward the bottom of the pan.

A still further object of the invention is to provide an apparatus of the above type, wherein the pans are placed therein in inverted position for greasing, and are turned to upright position for exit from the apparatus.

A still further object of the invention is to provide a device of the above type, wherein the chamber directly beneath the pans as the grease is applied thereto is provided with an elevator for lifting the powdered oil settling in the bottom of the chamber into the path of the incoming air current, which carries the powdered grease and discharges the same against the surface of the pan being greased.

A still further object of the invention is to provide an apparatus of the above type with means for supplying powdered oil to the incoming air current in such a way that said powdered oil may be taken into the air current in a finely divided form without lumping.

A still further object of the invention is to provide a circlulating means for the air which includes a bypass for the discharge of a certain amount of air to the atmosphere, which circulating means is connected with the chamber having the entrance opening and the exit opening for the pans, so that a certain amount of circulating air is drawn from said chamber, thus insuring the entrance of air into the entrance opening and exit opening, and preventing the escape of any of the circulating air charged with the grease to the atmosphere, said bypass in the circulating means being provided with a device for retaining any powdered oil in the escaping air through the bypass.

These and other objects will in part be obvious and will in part be hereinafter more fully disclosed.

In the drawings which show by way of illustration one embodiment of the invention—

Figure 1 is a side view of an apparatus embodying the improvement, parts being broken away to show some of the interior structure;

Fig. 2 is a front view of the same;

Fig. 3 is a transverse sectional view through the machine and through the devices for directing the circulating air with the powdered oil against the inner surface of the baking pan;

Fig. 4 is a longitudinal sectional view through the machine;

Fig. 5 is a detail showing certain parts of the machine, and showing the pan in position for greasing and as inverted for discharge from the machine, and also a pan discharged from the machine;

Fig. 6 is a sectional view through the inverter for the pan;

Fig. 7 is a side view of said inverter;

Fig. 8 is a detail in section showing the manner of supportng and operating the inverter, and also the manner of supporting the ejecting rod;

Fig. 9 is a view partly in section and partly in side elevation showing the means for operating the cross-head which opens and closes the valves, and also showing the means for feeding the powdered oil to the air current;

Fig. 10 is a detail showing the ratchet means for permitting the feed of the powdered oil to the air current, and Fig. 11 is a detail in section showing the progressive opening of the nozzle and the greasing of the pan.

The invention is directed broadly to an apparatus for greasing baking pans, such as bread pans or the like. The oil is applied thereto in powdered form. The oil used may be any edible, vegetable or mineral oil or fat which can be effectively finely powdered, or which is susceptible to dehydrogenization to a degree sufficient to be rendered into a suitable pulverulent form at ordinary temperature, and which, when heated, as during cooking, will melt. It is preferred to use cotton seed oil, although there are numerous fats and fatty oils which might answer the purpose. The fat is preferably hardened by hydrogenization to suit the state of hardness where it will resist melting; except in a high temperature. It is then reduced in any suitable way to a very fine powder so that the grease may be carried in suspension in the air current and projected or dusted against the surface of the utensil which is to be greased.

My improved apparatus has for its purpose the greasing of baking pans by utilizing a current of air charged with a powdered oil such as referred to above. The apparatus includes a chamber having a valve controlled outlet over which the pan to be greased is placed. Said apparatus also includes a chamber having an entrance opening and an exit opening which permits the baking pan to be placed over the valve controlled outlet for greasing. Air is circulated by any suitable means and the air is charged with the oil in finely powdered form, so that the oil is carried in suspension in the air current. This valve controlled opening is so disposed that a current of air charged with the powdered oil is directed against the inner wall of the baking utensil and preferably in a direction at right angles to the wall at the mouth thereof. The valve for controlling the air is progressively opened and then closed. As the valve opens, the air current is less confined, and as a result, the coating of the oil on the wall of the pan is of a maximum thickness at the mouth of the pan, and this actually decreases to a minimum at the bottom edges of the side wall and across the bottom of the pan. The air after having performed its function of carrying the grease against the wall of the pan, passes down into the chamber beneath the pan, and is drawn by suitable means through an outlet and around by a supply means where the air is charged with powdered oil and then again delivered to the chamber beneath the pan which is to be greased. In this chamber beneath the pan, there is an elevator which carries any powdered oil accumulating in the bottom of the chamber up into the circulating air stream. This air circulating means is provided with a bypass which leads preferably into a fabric receptacle so that the air may pass out through the fabric while the powdered oil is retained in the receptacle and returned to the circulating air current passing into the chamber beneath the pans. The purpose of this bypass is to cause a certain amount of the air which is to be circulated to be taken from the chamber above the pans that are being greased. The air from this chamber above the pans is drawn down into the chamber beneath the pans in order to supply a proper amount of circulating air to make up for the air which is bypassed, and this insures that a certain amount of air is drawn in through the entrance opening and the exit opening, and prevents any escape of air charged with the powdered oil. When a pan is inserted in the apparatus for greasing, it forces the pan already in the apparatus forward one step to an inverting means, and when the valves are operated to perform the cycle of greasing a pan inserted in the apparatus, the inverter is also operated to invert the pan, so that when it is discharged from the apparatus, it is right side up.

Referring more in detail to the drawings, my improved apparatus for greasing pans consists of a frame structure 1 carried on suitable supporting castors 2, 2. Within the frame is a chamber 3 formed of suitable metal parts having side walls 4, 4 and end walls 5, 5, and a bottom wall 6. At the upper part of this chamber is a discharge head 7 having a series of openings 8, 8 and a valve 9 for each opening. The valve 9 is in the form of a tappet valve, with the edges thereof beveled as indicated at 10. The edge of the valve overlies the edge of the opening 8. Between the walls of the openings 8, 8 are inclined upper walls 11.

The pans to be greased are indicated at P in the drawings. The pans are placed on a shelf 12 and are moved into a chamber 13 having an arch-shaped covering member 14, through an entrance opening 15. Suitable supporting bars 16 are provided for the side edges of the pan. These bars are so positioned that the valve is within the pan when the pan is in proper position for greasing. The pan is passed through the entrance opening and over the top of the valve. The beveled side edges of the valve will prevent any possible chance of the pan being caught by the valve, or the upper end of the wall forming the opening 8.

The valves 9 are pivotally connected to a cross-head 17. This cross-head 17 extends through suitable openings in the walls 5, 5, and the openings are closed by covering pieces 18, 18 which are attached to and move with the cross-head 17. In the upper part of the apparatus and extending through the chamber 13 is a shaft 19. This shaft is provided with eccentrics 20, 20, and eccentric straps 21, 21 cooperating with the eccentrics are connected to the cross-head and raise and lower the crosshead 17. When the cross-head is raised, the valve 9 will be raised, and valve 9 will be progressively raised and lowered by the rotation of the shaft 19. During each greasing operation, the shaft 19 makes one complete rotation, and this will cause the valve to raise and lower, opening and closing the openings 8.

A current of air is delivered to the chamber 3 by means of a pipe 22 which extends through the wall of the chamber. This current of air is thoroughly charged with the powdered oil of the above type, so that the charged air conveys the oil in suspension. When the valves 9 are opened, the current of air with the oil in suspension, will pass out through the openings 8 beneath the valves. As noted above, the pan extends down over the valve slightly, and therefore, the current of air as it escapes over the upper edge of the wall forming the opening 8, and beneath the valve head, will strike against the wall of the pan in a direction substantially at right angles and will impinge against the wall at the mouth of the pan first. As the valve continues to open, the stream of air will widen out and gradually creep up the side wall of the pan until a point is reached near the bottom of the pan. The air, of course, circulating across the bottom of the pan, will convey powdered oil against the bottom of the pan. This progressive opening of the valve will cause a greater amount of oil to be placed against the side wall of the pan adjacent the mouth of the pan, and the thickness of the layer will gradually decrease toward the bottom of the side walls, and across the bottom of the pan. This is the most advantageous placing of the oil on the pan for greasing purposes. The curernt of air passing out of the pan being greased, will pass into a chamber 23 within which the chamber 3 is located. This chamber 23 is provided with a front wall 24, a rear wall 25, and side walls 26, 26. It is also provided with a bottom wall 27 having an opening 28 to which the pipe 29 is attached. The chamber 23 is also connected with the chamber 13. The pipe 29 leads to the center of a centrifugal pump or fan 30 (see Fig. 1). This pump 30 draws the air from the chamber 23, and delivers air to a pipe 31 which is connected to the pipe 22. The pipe 31 is provided with a bypass 32 so that a portion of the air delivered to the pipe 31 by the pump 30 is caused to pass out through this bypass 32 and into a fabric bag 33. The fabric bag permits the air to pass out and escape, but the powdered oil carried in suspension in the air will collect within the bag 33. This bag 33 is directly above the pipe 31, and the oil will drop by gravity back into the pipe 31, and will be taken up by the air current which passes along through the pipe 31 to the pipe 22.

The pipe 31 is supplied with powdered oil from a supply chamber 34. Said supply chamber 34 is provided with a series of inclined baffle plates 35 at the upper end thereof and at the entrance of the chamber 34 into the pipe 31. This chamber 34 is provided with a bottom portion 36 which is normally forced upwardly by means of a spring 37. A cord 38 surrounding a drum 39 limits the upward movement of the bottom portion 36. As this cord is released, the spring 37 will gradually move the bottom 36 upwardly, and this will force the powdered oil up through the baffle plates and into the pipe 31. The drum is gradually unwound, and therefore, the powdered oil is gradually fed into the air current 31. This gradual feeding of the oil through the baffle plates, enables the powdered oil to be delivered to the air current in a finely powdered form without lumping.

The drum 39 is unwound by means of a worm wheel 40 which engages a worm gear 41 on a shaft 42. The shaft 42 carries a ratchet 43, and a lever 44 pivoted to the shaft 42 carries a pawl 45 which engages the ratchet. This lever 44 is operated by a flexible member 46 which runs over a guide rod 47 and is connected at 48 to the cross-head 17. When the cross-head is raised, it will pull on the flexible member 46 and raise the lever 44 so as to turn the shaft carrying the worm gear one step, and this will turn the worm wheel 40 so as to permit the drum to turn one step. By the use of a worm wheel and gear, the spring 37 cannot turn the shaft carrying the drum, except as the worm wheel is turned to permit the shaft to rotate.

A shaft 49 is mounted in suitable bearings in the side walls 44 of the chamber 3. This shaft 49 is provided with a series of elevators 50. These elevators pass along the bottom wall 6 of the chamber 3, and will pick up powdered oil accumulating in the bottom of the chamber and carry said oil into the air current passing out of the pipe 22. As the air passes across the elevator 50, it will take up any powdered oil thereon and the powdered oil will thus be brought into suspension in the air current. Directly beneath the openings 8, 8 are baffle plates 51. These baffle plates are for the purpose of equalizing the air current passing up and out through the openings 8 and beneath the valves 9. In other words, these baffle plates insure that the air current will be substantially uniform all the way across the machine.

Mounted on the frame of the machine is a motor M. This motor is connected to the shaft for operating the rotary pump so that when the motor is turning, the pump is in continuous rotation. A belt 52 running over a suitable belt wheel on the shaft 52$^a$ engages a belt wheel 53 on a stub shaft 54. This stub shaft 54 carries a gear 55 meshing with a gear 56 attached to the shaft 49. The gear 55 is much smaller in diameter than the gear 56, so that the shaft 49 is turned comparatively slowly. As shown in Fig. 1 of the drawings, the shaft 52$^a$ is in alinement with the shaft of the motor, and may be connected thereto by a friction clutch 57. Also mounted on the shaft 52$^a$ is a belt wheel 58. A belt 59 runs over this belt wheel 58 and over idlers 60 and 61. This belt 59 drives a large belt wheel 62 mounted on a shaft 63. The shaft 63 carries a gear wheel 64 which meshes with a gear wheel 65 carried by a stub shaft 66. A sprocket chain 67 runs over a sprocket wheel 68 on the stub shaft 66, and also over a sprocket wheel 69 carried by the shaft 19. Thus it is that the shaft 52$^a$ is connected to the shaft 19 for operating said shaft, and the shaft 19 operates the valve controlling the discharge of the air into the pan for greasing the same. It is desired to give the shaft 19 which operates the valves one complete rotation, and then cause the same to come to a stop, so that the valves may be raised, the pans greased, and then the valves closed until another pan is placed in the apparatus for greasing. This is accomplished by means of a controlling cam 70. The controlling cam 70 is secured to the shaft 63. Said cam is provided with a recess 71. A plate 72 is pivoted at 73. This plate carries a roller 74. A spring 75 normally tends to turn the plate in a clockwise direction about its pivotal support as viewed in Fig. 1, and this presses the roller 74 continually against the periphery of the controlling cam 70. A rod 75' is connected to the plate 72 to a bell crank lever 76. This bell crank lever 76 is pivoted at 77, and has an upwardly projecting arm 78, to which a hand knob 79 is connected. This hand knob is adjacent the entrance opening to the machine, and the operator can readily reach the knob and pull on the same so as to turn the bell crank lever 76 in a direction which will pull on the rod 75' and cause the plate 72 to swing so as to remove the roller 74 from engagement with the recess 71 in the controlling cam 70.

Also mounted on the pivotal support 73 is a lever 80. This lever is provided with a projecting portion 81 which rests against the plate 72. The lever at the lower end is connected to a spring 82. This spring in turn is connected at 83 to the frame of the machine. A rod 84 connects the lower end of this lever 80 with a clutch operating plate 85. A spring 86 connected to this clutch plate 85 and to the frame of the machine, operates to yieldingly force the clutch members into engagement when the lever 80 is released so as to permit the spring to operate in the manner stated. The spring 82 is much heavier than the spring 86 and will separate the clutch members when it is permitted to operate. When the plate 72 is swung so as to bring the roller 74 out of the recess in the controlling cam, this will move the lever against the tension of the spring 82 so as to permit the spring 86 to close the clutch parts. The roller traveling on the periphery of the cam 70, will hold the parts so that the motor is clutched to the shaft 52$^a$ and will drive the shaft through one rotation of the controlling cam. When the controlling cam has made its complete rotation, the roller will drop into the recess 71, thus releasing the lever 80 and allowing the strong spring 82 to separate the clutch members.

Means is provided for turning the pans to upright position after they are greased. This means consists of a turning rack 87 composed of bars extending longitudinally thereof, and side frames which make up a receptacle open at both ends. This turning rack is pivoted at 88 on short stub shafts journaled in the frame of the machine. On this stub shaft are sprocket wheels 89 and a sprocket chain 90 runs over each sprocket wheel 89 and an associated sprocket wheel 91 on the shaft 19. These sprocket wheels are so proportioned that when the shaft 19 makes one rotation, it will turn the turning rack through an arc of one hundred and eighty degrees, or give the rack a half rotation.

A bar 92 carried by cross-heads 93, 93, mounted to slide between guide bars 94, 94, at each side of the turning rack, is for the purpose of aiding in the removal of the pan from the turning rack. At the end of the turning rack there is a roller 95 which is close to the exit opening 96, and also adjacent the exit opening is a shelf 97 on to which the pans may be moved.

Referring to Figures 4 and 5, it will be noted that the pan P is in position for greasing. When another pan is inserted through the entrance opening 15, it may be placed against the pan which has just been greased, and the greased pan moved forward into the turning rack. The pan engages the bar 92 and will move it forward as shown in Fig. 4. The greased pan is indicated in this figure at P'. During the greasing of the pan P, which has just been inserted in the apparatus, the shaft 19 is rotated to control the valves and also operates to give the turning rack a half rotation to the position shown in Fig. 5. When the next pan is inserted, the pan which moves into the turning rack will force the pan P therein to the position indicated at P'' (see Fig. 5).

The parts 8 referred to as openings are, in effect, discharge nozzles or cells through which the air current flows when the valve is open for carrying the powdered oil which is in suspension in the air against the inside of the pan. It will be understood that these cells may be made in the form of a detachable unit for the upper end of the chamber 3 so that other cells may be substituted therefor for greasing pans of different dimensions and sizes.

The operation of my device will be apparent from the description which has been given above. The pans to be greased are inserted through the entrance opening 15, and each pan is placed over the nozzle 8. After the pan is placed over the nozzle 8, it may be pulled back against the positioning bar at the front of the machine. The insertion of the pans, as noted above, will force any pans which are in the machine, forward into the turning rack, and any pans which are in the turning rack, forward through the exit opening. After the pans have been properly placed in the machine, then the operator engages the hand knob 79, and by pulling back on the same, will release the controlling cam 70, and will also release the friction clutch so that the spring 86 will close the same, and cause the shaft 52$^a$ to be rotated from the motor M. As the shaft 52$^a$ rotates, it will, through the connecting train of mechanism therefore, rotate the shaft 19. The controlling cam makes one rotation, and then comes to a stop, as the operator after having moved the hand knob to start the device in operation, releases the same. During this cycle of operation, the elevator is actuated so as to lift the powdered oil accumulating in the bottom of the chamber 3 into the path of the circulating air issuing from the pipe 22. The air thoroughly charged with the powdered oil passes out through the nozzles when the valves are open, and the baffle plates associated with these nozzles, insure an equal distribution of the air through the several cells or nozzles. As noted, the nozzle extends into the pan to a slight distance, and therefore, when the valve begins to open, there will be a sheet or jet of air passing directly out from beneath the valves against the side wall of the pan, striking the side wall of the pan at substantially right angles. As the valve progresses in its opening movement, the extent of the opening of the nozzle increases, and therefore, while the air jet continues to strike the pan at the mouth, it will, as it widens, creep up the side wall of the pan to a position near the bottom of the pan. The air will also pass over the top of the valve and come in contact with the bottom of the pan. This insures the forming of a layer of powdered oil all over the inside of the pan. This layer is of greater thickness adjacent the mouth of the pan, which of course, has its good advantages. The air passes down into the chamber 23 and to the pipe 29. The pipe 29 leads to the chamber 30, and the pump discharges the air again into the pipe 31, which is connected with the pipe 22. The air as it passes along the pipe 31 is brought into contact with the new supply of powdered oil which is constantly fed up through the baffles 35 by the spring actuated bottom portion of the receptacle 34. This bottom portion moves up step by step every time the mechanism for operating the valves moves through a cycle.

A certain amount of the air circulating through the pipe 31 will bypass into the receptacle 33. This receptacle is made of fabric, and the air will escape through the wall of the receptacle. The powdered oil, however, will not escape, and will fall back into the pipe 31 and be taken up by the air current passing therethrough. The purpose of bypassing a certain amount of the air is to cause a certain amount of air be drawn in through the entrance and exit openings. The chamber 13 is connected with the chamber 23. The air issuing from the nozzles passes into the chamber 23 and thence into the chamber 29. This chamber 23 is under constant suction. Inasmuch as some of the air escapes through the receptacle 23, an additional supply of air must be taken in from the outside, and this is drawn in through the exit and entrance openings, as noted above. By this arrangement, the powdered oil is kept entirely within the confines of the dusting or greasing apparatus. No air laden with powdered oil escapes whatever.

It will be understood, of course, that various ways may be provided for supplying the circulating air with powdered oil; also that the arrangement and construction of the various parts of the apparatus may be greatly modified without departing from the spirit of the invention as set forth in the appended claims.

Having thus described the invention, what I claim as new and desire to secure by Letters-Patent, is—

1. In an apparatus for greasing baking pans, means for supporting the pan in inverted position, means for circulating air and directing the same against the surface of the pan to be greased including a nozzle conforming in cross section to the cross section of the pan being greased, said nozzle being disposed within and adjacent the plane of the rim of the pan, and means for charging the air with powdered oil.

2. In an apparatus for greasing baking pans, means for supporting the pan in inverted position, means for circulating air and directing the same against the surface of the pan to be greased including a nozzle conforming in cross section to the cross section of the pan being greased, said nozzle being disposed within and adjacent the plane of the rim of the pan, means for charging the air with powdered oil, a valve for closing the nozzle, an actuating shaft, an eccentric thereon, and means for connecting the eccentric to the valve whereby at each rotation of the shaft, the valve is opened and closed.

3. In an apparatus for greasing baking pans, means for supporting the pan in inverted position, means for circulating air and directing the same against the surface of the pan to be greased including a nozzle conforming in cross section to the cross section of the pan being greased, said nozzle being disposed within and adjacent the plane of the rim of the pan, means for charging the air with powdered oil, a valve for closing the nozzle, an actuating shaft, an eccentric thereon, means for connecting the eccentric to the valve whereby at each rotation of the shaft, the valve is opened and closed, and automatic means for stopping the actuating means when the shaft has made one complete rotation.

4. In an apparatus for greasing baking pans, a casing having entrance and exit openings, means within the casing for supporting the pan, means for circulating air and directing the same against the surface of the pan to be greased, means for charging the air with powdered oil, said air circulating means including a bypass to the atmosphere outside of said casing, whereby air is drawn in through the entrance and exit openings.

5. In an apparatus for greasing baking pans, a casing having entrance and exit openings, means within the casing for supporting the pan, means for circulating air and directing the same against the surface of the pan to be greased, means for charging the air with powdered oil, said air circulating means including a bypass to the atmosphere outside of said casing, whereby air is drawn in through the entrance and exit openings, said air circulating means including a nozzle over which the pan may be placed in inverted position, an actuating shaft, and means operated thereby for opening and closing the valve at each rotation of the shaft.

6. In an apparatus for greasing baking pans, a casing having entrance and exit openings, means within the casing for supporting the pan, means for circulating air and directing the same against the surface of the pan to be greased, means for charging the air with powdered oil, said air circulating means including a bypass to the atmosphere outside of the casing, whereby air is drawn in through the entrance and exit openings, said air circulating means including a nozzle over which the pan may be placed in inverted position, an actuating shaft, means operated thereby for opening and closing the valve at each rotation of the shaft, and a turning rack located within the casing for receiving the pan when moved from over the nozzle and for turning the pan to upright position prior to the passing of the pan through the exit opening.

7. In an apparatus for greasing baking pans, a casing having entrance and exit openings, means within the casing for supporting the pan, means for circulating air and directing the same against the surface of the pan to be greased, means for charging the air with powdered oil, said air circulating means including a bypass to the atmosphere outside of the casing, whereby air is drawn in through the entrance and exit openings, said air circulating means including a nozzle over which the pan may be placed in inverted position, an actuating shaft, means operated thereby for opening and closing the valve at each rotation of the shaft, a turning rack located within the casing for receiving the pan when moved from over the nozzle and for turning the pan to upright position prior to the passing of the pan through the exit opening, and automatic means for stopping the rotation of the actuating shaft at each complete rotation thereof.

8. In an apparatus for greasing baking pans, a casing having an inner and an outer chamber, means for drawing air through the outer chamber and delivering the same to the inner chamber, said inner chamber having a nozzle through which the air is discharged into the outer chamber, means for supporting the pan in inverted position over said nozzle, and means for charging the air with powdered oil.

9. In an apparatus for greasing baking pans, a casing having an inner and an outer chamber, means for drawing air through the outer chamber and delivering the same to the inner chamber, said inner chamber having a nozzle through which the air is discharged into the outer chamber, means for supporting the pan in inverted position over said nozzle, means for charging the air with powdered oil, a valve for controlling said nozzle, and actuating means for opening and closing said valve.

10. In an apparatus for greasing baking pans, a casing having an inner and an outer chamber, means for drawing air through the outer chamber and delivering the same to the inner chamber, said inner chamber having a nozzle through which the air is discharged into the outer chamber, means for supporting the pan in inverted position over said nozzle, means for charging the air with powdered oil, a valve for controlling said nozzle, actuating means for opening and closing said valve, and automatic means for stopping the actuating shaft at each complete rotation thereof.

11. In an apparatus for greasing baking pans, a casing having an inner and an outer chamber, means for drawing air through the outer chamber and delivering the same to the inner chamber, said inner chamber having a nozzle through which the air is discharged into the outer chamber, means for supporting the pan in inverted position over said nozzle, means for charging the air with powdered oil, said casing having an entrance and an exit opening through which the pan may be moved and placed over said nozzle, said means for drawing air from the outer chamber having a bypass to the atmosphere whereby the portion of air suplpied to the inner chamber is drawn in through the entrance and exit openings.

12. In an apparatus for greasing baking pans, a casing having an inner and an outer chamber, means for drawing air through the outer chamber and delivering the same to the inner chamber, said inner chamber having a nozzle through which the air is discharged into the outer chamber, means for supporting the pan in inverted position over said nozzle, means for charging the air with powdered oil, said casing having an entrance and an exit opening through which the pan may be moved and placed over said nozzle, said means for drawing air from the outer chamber having a bypass to the atmosphere whereby the portion of air supplied to the inner chamber is drawn in through the entrance and exit openings, said bypass to the atmosphere being closed by a fabric wall which permits the air to pass freely to the atmosphere and which retains the powdered oil and returns the same to the circulating air current.

13. In an apparatus for greasing baking pans, a casing having an inner and an outer chamber, means for drawing air from the outer chamber and delivering the same to the inner chamber, means for supplying the air with powdered oil as it passes from said outer chamber to said inner chamber, said inner chamber having a nozzle for delivering air to the outer chamber, means for supporting the pan to be greased in inverted position over said nozzle, said casing having an upper compartment above said nozzle with entrance and exit openings to permit the passing of the pan into the casing and over the nozzle and the discharge of the pan after it is greased, said compartment above the nozzle being connected with said outer chamber, said means for drawing the air from the outer chamber having a bypass to the atmosphere whereby a portion of the air is allowed to escape and thus insuring that air will be drawn through the entrance and exit openings in the upper compartment.

14. In an apparatus for greasing baking pans, a casing having an inner and an outer chamber, means for drawing air from the outer chamber and delivering the same to the inner chamber at a point above the bottom thereof, a nozzle for delivering the air from the inner chamber to the outer chamber, means for supporting the pan to be greased in inverted position over said nozzle, and means located within said inner chamber for elevating powdered oil accumulating at the bottom of the chamber into the air stream delivered to said inner chamber.

15. In an apparatus for greasing baking pans, means for suporting the pan, means for circulating air and directing the same against the surface of the pan to be greased including a nozzle conforming in cross-section to the cross-section of the pan being greased, and means for charging the air with powdered oil.

In testimony whereof, I affix my signature.

PHILIP W. WILCOX.